(No Model.)

C. NIEDERAUER.
Cultivator.

No. 236,243. Patented Jan. 4, 1881.

WITNESSES:

INVENTOR:
C. Niederauer
BY
ATTORNEYS.

UNITED STATES PATENT OFFICE.

CHARLES NIEDERAUER, OF LA GRANGE, TEXAS, ASSIGNOR TO HIMSELF AND HENRY STÜDEMANN, OF SAME PLACE.

CULTIVATOR.

SPECIFICATION forming part of Letters Patent No. 236,243, dated January 4, 1881.

Application filed June 26, 1880. (No model.)

*To all whom it may concern:*

Be it known that I, C. NIEDERAUER, of La Grange, Fayette county, Texas, have invented an Improvement in Cultivators, of which the following is a specification.

The invention consists in the means by which the plow or cultivator standards may be adjusted to regulate the depth of the cultivators or plows.

Figure 1:
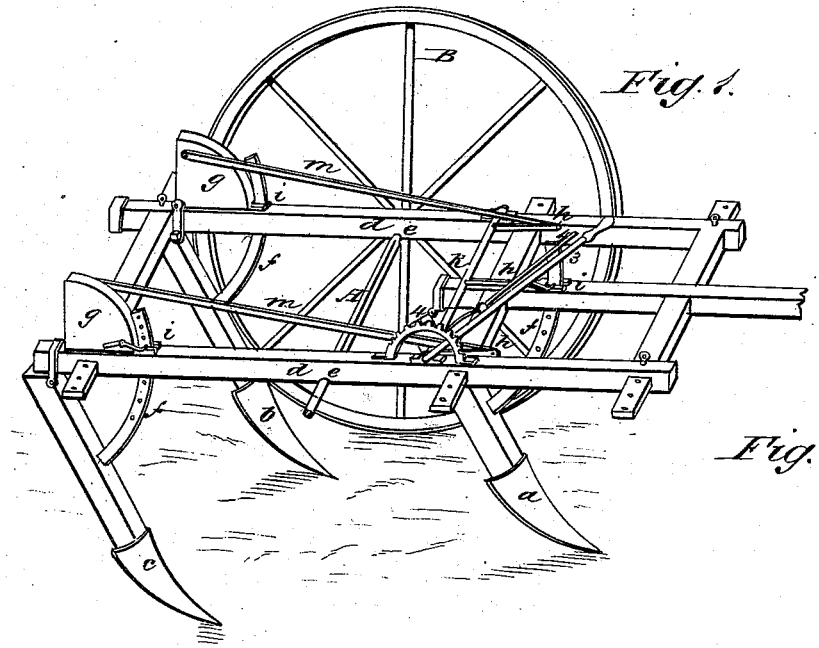
Figure 2:
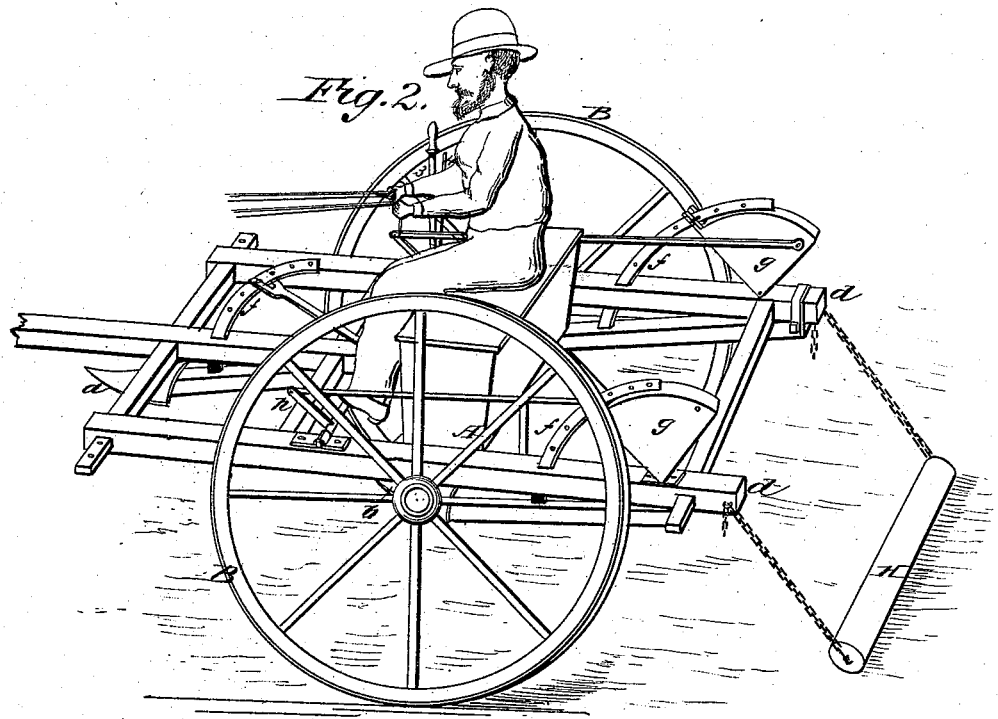

Figures 1 and 2 of drawings are perspective views, the first showing the machine ready for work, and the second with the plows raised to avoid obstructions.

In the drawings, the letters $a$ $b$ $c$ represent three plows hinged to an adjustable frame, $d$, which is provided with boxes $e$ resting on an axle, A, supported by wheels B.

$f$ are adjustable segments passing through slots $i$ of blocks $g$, and adapted to regulate the depths of the plows. The segment of the front plow passes through a forked lever, $h$, connecting with a rod, $k$, provided with bearings on the frame, and having two other levers, $h$, connecting with blocks $g$ by rods $m$.

By pulling a handle, $s$, which has the pawl and ratchet 4 4, the blocks are turned back and the plows elevated to avoid obstructions.

The side plows are adjusted as respects their distance apart by shifting the side pieces of the frame on the cross-pieces.

A seat of any suitable kind may be supported on the frame.

I am aware that it is not broadly new to hinge a plow-standard and provide it with an adjustable brace-rod, by which the depth of the plow is regulated.

What I claim as new and of my invention is—

1. The combination, with the hinged plows $a$ $b$ $c$, of the adjustable frame $d$, the adjustable segments $f$, the blocks $g$, having slots $i$, the forked lever $h$, the rod $k$, having bearings in the frame, the levers $h$, connecting, by rods $m$, with said blocks, and the handle $s$, having pawl and ratchet, substantially as shown and described.

2. The combination, with a plow-standard hinged to frame $d$, of the slotted pivoted block $g$, and the segment $f$, adjustably connected therewith, as and for the purpose specified.

CHARLES NIEDERAUER.

Witnesses:
A. HOIDUSEK,
R. H. PHELPS.